United States Patent
Blume et al.

(10) Patent No.: US 8,674,585 B2
(45) Date of Patent: Mar. 18, 2014

(54) ELECTROMECHANICAL MOTOR ESPECIALLY A PIEZOELECTRIC MICROSTEPPER MOTOR

(75) Inventors: Heinrich-Jochen Blume, Darmstadt (DE); Bernhard Gottlieb, München (DE); Andreas Kappel, Brunnthal (DE); Robert Wolfgang Kissel, Egelsbach (DE); Karl-Heinz Mittenbühler, Griesheim (DE); Tim Schwebel, München (DE); Carsten Wallenhauer, Schwarzheide (DE)

(73) Assignee: Continental Automotive GmbH, Hannover (DE)

( * ) Notice: Subject to any disclaimer, the term of this patent is extended or adjusted under 35 U.S.C. 154(b) by 589 days.

(21) Appl. No.: 12/600,719

(22) PCT Filed: Apr. 23, 2008

(86) PCT No.: PCT/EP2008/054900
§ 371 (c)(1),
(2), (4) Date: Jun. 3, 2011

(87) PCT Pub. No.: WO2008/141884
PCT Pub. Date: Nov. 27, 2008

(65) Prior Publication Data
US 2012/0146461 A1 Jun. 14, 2012

(30) Foreign Application Priority Data
May 18, 2007 (DE) .......................... 10 2007 023 201

(51) Int. Cl.
*H02N 2/12* (2006.01)

(52) U.S. Cl.
USPC .................. 310/323.02; 310/311; 310/328

(58) Field of Classification Search
USPC ..................... 310/323.02, 311, 328
See application file for complete search history.

(56) References Cited

U.S. PATENT DOCUMENTS

| | | | |
|---|---|---|---|
| 4,743,792 A | 5/1988 | Ueyama | |
| 4,757,223 A * | 7/1988 | Ueyama | 310/82 |
| 5,079,471 A * | 1/1992 | Nygren, Jr. | 310/328 |
| 6,664,710 B1 * | 12/2003 | Gottlieb et al. | 310/323.02 |
| 8,004,149 B2 * | 8/2011 | Blume et al. | 310/323.02 |
| 2011/0260580 A1 * | 10/2011 | Blume et al. | 310/323.02 |
| 2011/0266920 A1 * | 11/2011 | Blume et al. | 310/323.02 |

FOREIGN PATENT DOCUMENTS

| | | |
|---|---|---|
| DE | 37 21 682 | 4/1988 |
| DE | 100 10 392 | 11/2000 |
| DE | 103 22 836 | 12/2004 |
| EP | 1 098 429 | 10/2004 |
| WO | WO 2007031431 | 3/2007 |

* cited by examiner

Primary Examiner — Derek Rosenau
Assistant Examiner — Bryan Gordon
(74) Attorney, Agent, or Firm — Cozen O'Connor (57) ABSTRACT

A microstepper motor which comprises two electromechanical drive elements, especially piezoelectric bending actuators, having effective directions that are perpendicular to each other. These actuators act upon a drive ring to thereby rotate a shaft. The actuators are non-radially hinged to the drive ring via an approximately square shear-flexible and torsion-proof frame structure, the drive ring being arranged inside said frame. The drive according to the invention is compact, the frame and the drive ring being configured as a single injection-molded drive module.

15 Claims, 8 Drawing Sheets

ELECTROMECHANICAL MOTOR ESPECIALLY A PIEZOELECTRIC MICROSTEPPER MOTOR

PRIORITY CLAIM

This is a U.S. national stage of application No. PCT/EP2008/054900, filed on Apr. 23, 2008, which claims Priority to the German Application No.: 10 2007 023 201.4, filed: May 18, 2007, the contents of both being incorporated herein by reference.

BACKGROUND OF THE INVENTION

1. Field of the Invention

The present invention relates to an electromechanical motor, especially a piezoelectric actuating drive.

2. Prior Art

The cockpit of a motor vehicle attempts to achieve an optimum interplay of design and technology. Various pointer instruments are located within the field of view of the driver. These pointer instruments must meet different technical requirements and have a competitive price for the mass production of motor vehicles. The "Messwerk 2000" by Siemens VDO is an example of such a pointer instrument.

The "Messwerk 2000" is based on a four-pole stepper motor drive geared down by means of a single-stage worm gear drive. The four-pole stepper motor is driven by two sinusoidal coil current signals, phase shifted to one another by 90° in phase angle, as a function of time. The sign of the phase shift determines the direction of rotation and the frequency determines the speed of rotation of the motor shaft. Within one full period of 360° of the sinusoidal current variations, up to 128 intermediate stages can be set in a reproducible manner. The utilization of these intermediate stages is called microstepper operation.

A complete "Messwerk 2000" actuating drive containing the stepper motor characterized above consists of 12 single parts. The stepper motor itself is composed of two coils with a common stator plate and a permanent-magnet rotor. With regard to the component costs, the coils and permanent magnet account for most of the costs. Apart from the material costs, the production costs are also decisive for the price which increase approximately proportionally as the number of components of the actuating drive increases.

In EP 1 098 429 B1, an electromechanical motor operating without rotating coils is known in which, during the operation, a drive ring is displaced whilst rotating by an operation, offset in time, of at least two electromechanical drive elements so that, by a direct transfer of force from the drive ring to the shaft, which, in particular, is located within the drive ring, so that the shaft is rotated. The rotating displacement movements of the drive ring can be produced by an actuator which is driven piezoelectrically, magnetostrictively, electrostrictively or electrodynamically, so that an actuating drive which is better suited for mass production with regard to material costs and production costs is obtained. The piezoelectric actuators are attached to the drive ring in such a manner that their respective displacement acts radially on the drive ring in which context, if necessary, other measures are also taken to achieve an introduction of force on the drive ring which is as symmetric as possible.

Although the technical circumstances mentioned last result in a drive optimized with regard to function, having the best constant-velocity characteristics (constancy of rotational speed independently of the instantaneous position of the shaft) without torque fluctuations, the longitudinal extent and the radial arrangement of the bending actuators entail that the planar drive variants require considerable space in the plane and in most cases appear to be not very compact. However, compact planar drives are urgently needed due to the very narrow installation space conditions given in cockpit instruments.

SUMMARY OF THE INVENTION

An object of the present invention is to in provide a stepper drive optimized with regard to the number of parts, production expenditure, requirement of installation space and functionality, especially a microactuating drive for meter movements of cockpit instruments.

This object is achieved by an electromechanical motor, especially a piezoelectric microstepper motor.

The electromechanical stepper drive according to the invention has the following features:

Two electromechanical, preferably piezoelectric, drive elements (actuators) which exhibit effective motion directions aligned approximately perpendicularly to one another, and a shaft supported rotatably in a drive ring in such a manner that the drive ring can be excited by a deflection of the piezoelectric drive elements into the respective effective direction to perform a displacement movement which can be transmitted directly to the shaft, such that the shaft rolls in the drive ring, and as a result, rotates, whilst the two electromechanical drive elements are hinged by a shear-flexible and torsionally rigid approximately square frame structure nonradially to the drive ring arranged inside the square frame structure and rigidly connected to it.

Due to the shear-flexible but torsionally rigid square frame structure it is no longer necessary to pay attention to the radial force introduction of the forces provided by the bending actuators into the drive ring with respect to the center point of the annular hole in this arrangement since the torque, caused by a non-radial eccentric force introduction onto the drive ring, is absorbed essentially without torsion by the shear-flexible frame structure and the fixing thereof at one of its corners, for example in a housing. This opens up the possibility of a space-saving arrangement of the drive elements, especially along the outer or inner sides of the square-frame structure. This makes it possible to achieve a very compact installation-space-saving structure of the stepper drive.

Based on the predetermined dimensioning of the drive elements, relatively long drive elements are advantageously allocated along the outer sides and relatively short ones along the inner sides, that is to say in the interior, of the substantially square or rectangular frame structure. The stepper drive according to the invention is also characterized by a very low number of simple components so that it is especially suitable for mass production. Furthermore, a thermal detuning of the drive occurring due to different thermal expansion of plastic and actuator is constructionally reliably absorbed. Due to positive locking by a toothing formed between drive ring and shaft, a very high actuating accuracy of the drive according to the invention is achieved in purely controlled operation without having to use sensors and a closed loop.

In addition, the shear-flexible hinging of the two electromechanical, preferably piezoelectric drive elements, results in the advantage that their directions of movement are decoupled from one another so that the drive elements do not impede one another in their movement, or only impede one another to a negligibly low extent. Thus, due to the flexible structure of the square frame, no energy losses occur during the application of force.

According to one embodiment of the invention—in the interest of optimizing compactness—it is not attempted to achieve an absolutely completely symmetric application of force to the drive ring. The consequences possibly resulting from this with regard to the function, e.g. slight constant-velocity and torque fluctuations, can be reduced by further measures to such an extent that the customer's specifications are still adhered to. In particular, small torques can be compensated for by driving the drive elements in a way modulating the pure sinusoidal variation.

In a particularly advantageous embodiment of the invention, the square or rectangular frame structure consists of four corner elements arranged approximately in the corners of a square, which are in each case connected to one another by a pair of approximately parallel rod elements, the rod elements being linked to the corner elements in each case by a flexure hinge, and a corner element being rigidly connected to the drive ring. The paired, approximately parallel arrangement of the rod elements in combination with their linkage to the corner elements by means of flexure hinges has the consequence that the approximately square frame structure formed from this can be easily (i.e. almost free of forces) deformed in each direction of the plane in the form of shearing. In contrast, the square frame structure thus formed opposes a torsion of any two corner elements relative to one another with high resistance. If a corner element is fixed in a housing, the opposite corner element can be displaced relative to it in the plane, but not rotated. The drive ring is therefore rigidly connected to this translatable corner element. As a result, the drive ring is also easily displaceable, but not rotatable. Every torque engaging it is absorbed by the essentially torsionally rigid frame structure and diverted to the fixed corner element or to the housing, respectively, without the drive ring being significantly rotated during this process.

The flexure hinges can be formed in each case by a tapering of the cross section of the rod elements in a short section which is of advantage especially from the point of view of production. This embodiment can be constructed even more advantageously, namely with distinctly greater torsional rigidity of the square frame structure overall. For this purpose, in at least one pair of cross-sectional tapers which are allocated to the same pair of rod elements and the same corner element, at least one of the cross-sectional tapers of the pair is constructed offset to the center axis of the respective rod element in such a manner that the distance between the points of rotation formed by cross-sectional tapers of the pair is enlarged with respect to the distance of the cross sectional tapers arranged in each case centrally.

If according to one embodiment, the application of force is not intended to take place by bending actuators, an embodiment is advantageous in which the moving end of in each case one electromechanical drive element engages in each case one neighboring corner element of the corner element connected to the drive ring.

If, according to another embodiment, the application of force is to take place by bending actuators, at the corner element connected to the drive ring, two tension-compression rods arranged approximately perpendicularly to one another are linked which, outside or inside the square frame structure and extending in parallel with the respective rod elements linked to said corner element, extend with their free ends in each case at least into the area of the associated neighboring corner element of the corner element connected to the drive ring, the moving end of in each case one electromechanical drive element engaging the free end of in each case one tension-compression rod. According to one development, the tension-compression rods can also in each case have one flexure hinge toward their two ends.

The two electromechanical drive elements can be constructed especially advantageously as bending actuators, preferably piezoelectric bending actuators.

Such solid-state bending actuators based on piezoelectric ceramic materials have been variously used in industry in different types of design for many years. They are distinguished by a small design, a low energy demand and high reliability. Thus, for example, a piezoelectric bending actuator has a service life of at least $10^9$ cycles in an industrial environment.

A particularly compact variant of the stepper drive according to the invention is obtained by arranging the two bending actuators outside or inside and approximately in parallel with the two sides of the square frame structure which are opposite the corner element connected to the drive ring, the bending actuators in each case engaging with their moving end the respective neighboring corner element of the corner element connected to the drive ring or the free end of the respective tension-compression rod.

In a development of the last-mentioned embodiment, the corner element opposite the corner element connected to the drive ring is fixed to a housing and has two receptacles which are in each case provided for the rigid attachment of a bending actuator at its resting end. In this preferred embodiment of the present invention, the essentially strip-shaped bending actuators are rigidly clamped or attached mechanically at one end. Electrical contacting of the bending actuators is also preferably performed at this end. Corresponding to the electrical activation of the bending actuators, a deflection in its effective direction is achieved at the opposite moving end.

The bending actuators used in a microactuating drive for, for example, pointer instruments are typically dimensioned in such a manner that they have a free deflection within a range of approx. 0.2 mm to 2 mm at their moving end. In addition, a blocking force within a range of from 0.5 N to 2 N is achieved in the case of a blockage of the deflection of the freely moving end of the bending actuator. The approximately straight-line deflection of the bending actuator is in each case transverse with respect to its greatest longitudinal extent. The direction of deflection corresponding to the effective direction of the bending actuator is thus approximately orthogonal to the longitudinal axis of the bending actuator.

In all variants of the invention, it is advantageous to construct the square frame structure and the drive ring together as a drive module fabricated in one piece by a plastic injection-molding technique, the bending actuators also being injected into the drive module. Implementing the drive module by plastic injection-molding technique is simple and cost effective, including the bending actuators in the injection molding process reducing the number of production steps even further.

To support the drive module stiffly and to support the associated shaft rotatably, respectively, it is advantageous to provide an approximately cubic housing with a lid, a central bearing block with a support surface and with a first bearing hole being provided in the housing and a second bearing hole for the shaft being provided in the lid and a corner element of the square frame structure. The corner element is provided for fixing, arranged in a housing corner, stiffly and permanently fixed, such that the at least one cylindrical rolling area of the shaft can roll in an associated rolling area of an annular bore of the drive ring.

BRIEF DESCRIPTION OF DRAWINGS

The preferred embodiments of the present invention will be explained in greater detail with reference to the accompanying drawing, in which.

DETAILED DESCRIPTION OF THE DRAWINGS

Figure 2A:
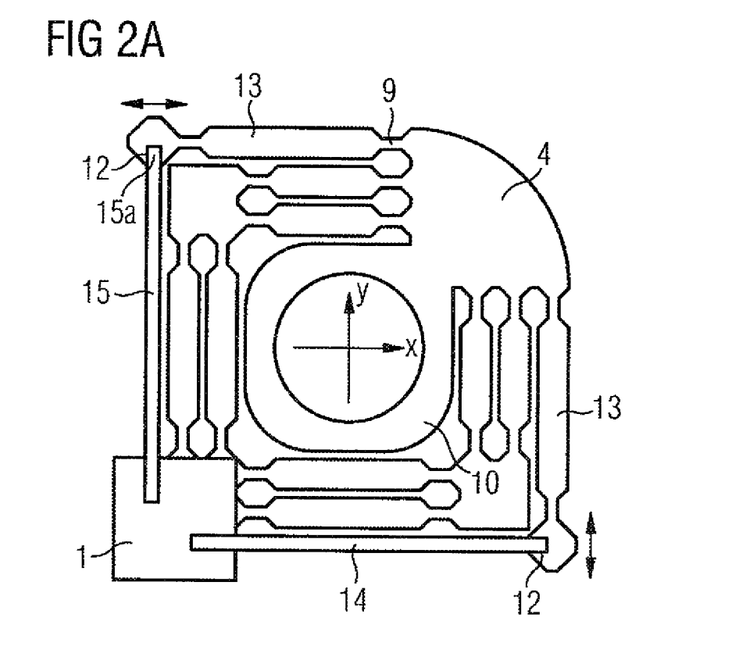
FIGS. 2A and 2B are, in each case in the same views as FIG. 1, the drive module with inserted bending actuators.
Figure 2B:
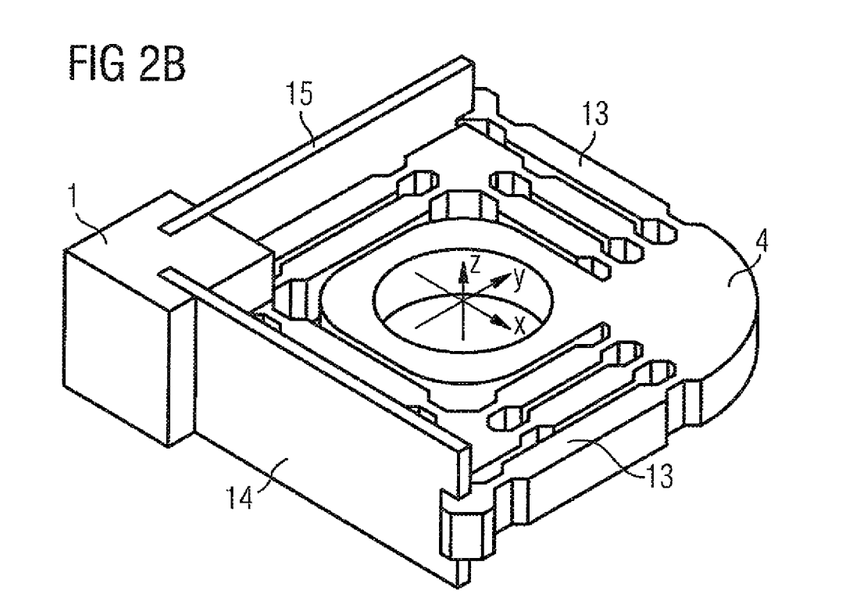

According to the invention, a piezoelectric stepper motor is presented that allows a continuous and uniform rotation to be generated by superimposing suitable periodic linear movements of bending actuators. For this purpose, the bending actuators 14, 15, FIGS. 2A and 2B, are coupled to a flat drive ring 10 by means of a shear-flexible square frame structure 31 such that the drive ring can be translated along the mutually perpendicular effective directions x and y (shown in FIG. 2A) of the bending actuators 14, 15. The square frame 31 together with the drive ring 10 and, if necessary, the integrated bending actuators 14, 15 will be called "drive module" in the text which follows. The drive module can be produced of polyethylene, injection-molded plastic, POM or of other suitable materials with the aid of an injection-molding technique.

Figure 1A:
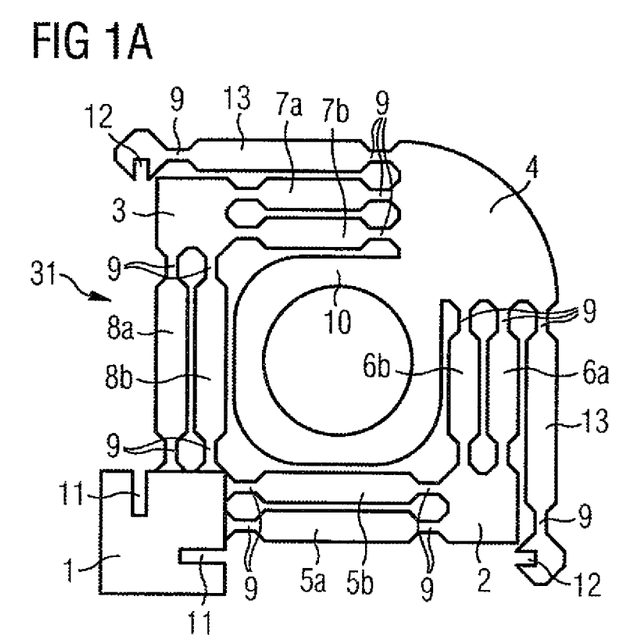
FIGS. 1A and 1B are an embodiment of a drive module, formed from a cubic frame structure and drive ring, for a stepper drive according to one embodiment the invention, in a top view and a perspective view, respectively.

FIG. 1A is the drive module in a top view and FIG. 2B is the drive module in a perspective view. The drive module consists of four corner elements 1, 2, 3, 4, arranged approximately in the corners of a square, which are connected to one another with four pairs of rod elements 5a, 5b, 6a, 6b, 7a, 7b, 8a, 8b and, together with the corner elements 1, 2, 3, 4 approximately form the square frame 31.

The rod elements 5a, 5b, 6a, 6b, 7a, 7b, 8a, 8b are linked to the corner elements 1, 2, 3, 4 by flexure hinges 9. Like normal hinges, flexure hinges provide for an almost unimpeded rotation of the connected elements relative to one another, but only within a limited angular range. Their operation is based on a bending principle. The local bending is achieved, as is obvious in FIG. 1A, by a selective reduction of the rod cross section in a short section. The reduced rod cross section leads to a greatly reduced flexural stiffness. Since the cross-sectional tapering is greatly localized, however, the axial spring rate (stiffness) of the respective rod is scarcely reduced.

The paired, approximately parallel arrangement of the rod elements 5a, 5b, 6a, 6b, 7a, 7b, 8a, 8b in combination with their linkage to the corner elements 1, 2, 3, 4 by flexure hinges 9 has the consequence that the resultant approximately square frame structure 31 can be deformed easily (i.e. almost free of forces) in any direction of the plane in the form of a shearing.

In contrast, a torsion of two arbitrary corner elements relative to one another is opposed by the frame structure 31 with high resistance.

Figure 5A:
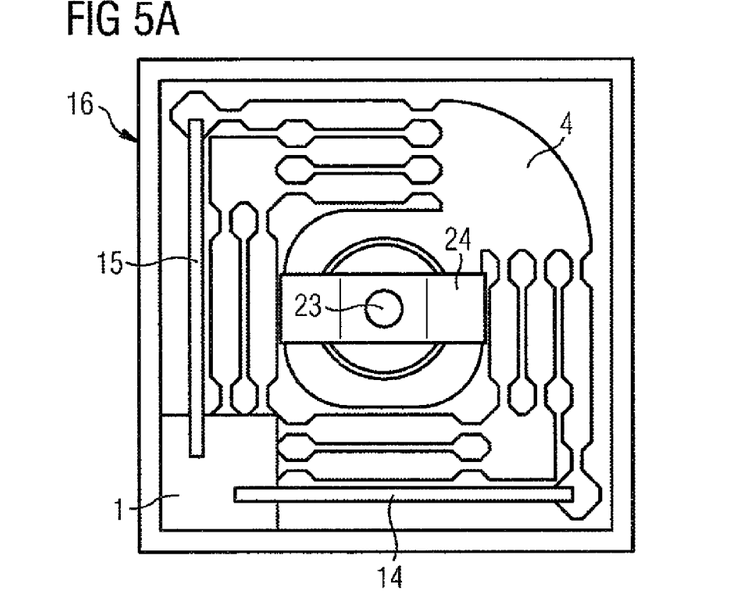
FIGS. 5A and 5B are, in each case in the same views as FIG. 1, a partial assembly of the stepper drive according to one embodiment of the invention.
Figure 5B:
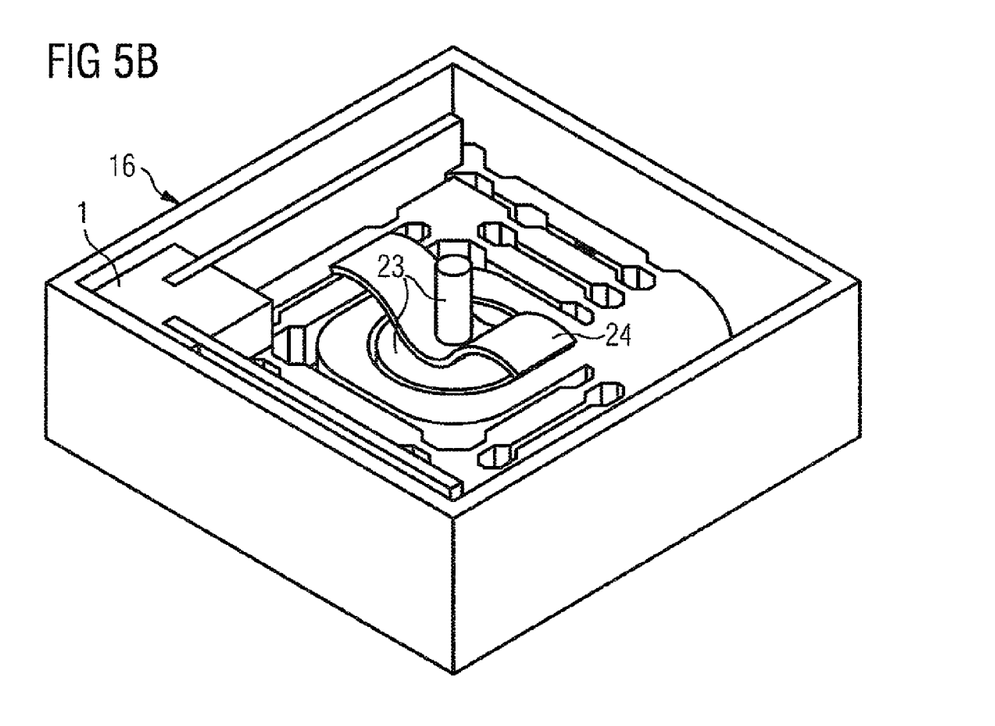

If, for example, the corner element 1 is fixed (as is described later in conjunction with FIG. 5), corner element 4 can be displaced relative to it in the plane but not rotated. The drive ring 10 is therefore connected rigidly to the corner element 4. The drive ring 10 is easily displaceable but not rotatable. Any torque engaging the drive ring 10 is absorbed by the torsionally rigid frame structure 31 and diverted to the fixing of the corner element 1 without the drive ring 10 being significantly rotated during this process.

Figure 1B:
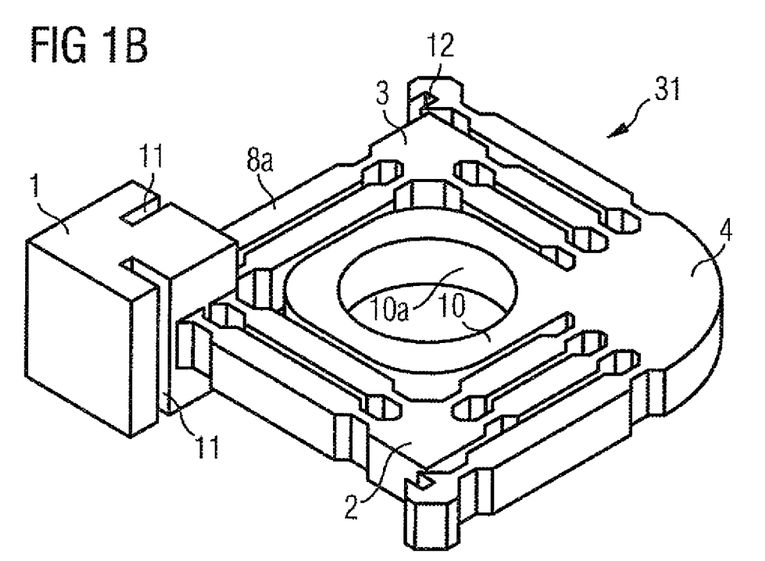

As a result, according to the invention, it is no longer necessary to pay attention to the radial force application of the forces provided by the bending actuators 14, 15 in the drive ring 10 with respect to the center point of the annular hole 10a, compare FIG. 1B, since the torque caused by a nonradial force application on the drive ring 10 is absorbed essentially free of torsion by the frame structure 31 and the fixing of the corner element 1.

The fixed corner element 1 contains receptacles 11 for the stiff securing of two bending actuators 14, 15 (first shown in FIGS. 2A and 2B) at their resting end. In addition, measures, not shown here, which are used for electrically connecting the bending actuators by pressure contact pin, clip contact or yoke spring contact provided in the receptacles 11. Optionally, the bending actuators 14, 15 can also be electrically contacted at their opposite moving end or area, respectively.

In the exemplary embodiment according to FIGS. 1A and 1B, the moving end 15a, shown in FIG. 2A, of the bending actuators 14, 15 are held in each case in one receiving body 12 from which its drive movement or its drive force is conveyed to the corner element 4, and thus to the drive ring 10, via in each case one tension-compression rod 13. The tension-compression rods 13 are also coupled to the corner element 4 or the receiving bodies 12, respectively, by flexure hinges 9, that is to say shear-flexibly, so that the bending actuators 14, 15 can act completely independently of one another on the drive ring 10 or, respectively, do not have to work against the comparatively high mechanical stiffness of the other bending actuator in each case. The movements of the bending actuators 14, 15 are thus decoupled.

If a bending actuator 14, 15 is electrically activated, it bends approximately in the form of a circular arc as a result of which the slope of the tangent of the bending line changes at the moving bending end. This type of "rotational movement" is reliably absorbed by the flexure hinges 9. Similarly, a change in the bending length relative to the drive module (e.g. due to different thermal expansion of the frame structure 31 and of the bending material) is reliably absorbed by the compression-tension rod coupling 13 with flexure hinges 9 in that the compression-tension rod 13 is rotated minimally without this impairing the function.

FIGS. 2A and 2B show the drive module with the bending actuators 14, 15, the electrical contacting of the bending actuators 14, 15 not shown. The bending actuator 14 can be used for producing a movement of the drive ring 10 in the y direction and the bending actuator 15 can be used for producing a movement of the drive ring 10 in the x direction, relative to the corner element 1. In each case, the deflection can thus be in the positive or negative x or y direction, respectively, as indicated in FIG. 2A.

To implement the kinematics principle associated with the drive module in a stepper motor, a shaft and a support thereof which is as free of play as possible but rotatable, and a stiff support of the drive module also is preferably required.

Figure 3A:
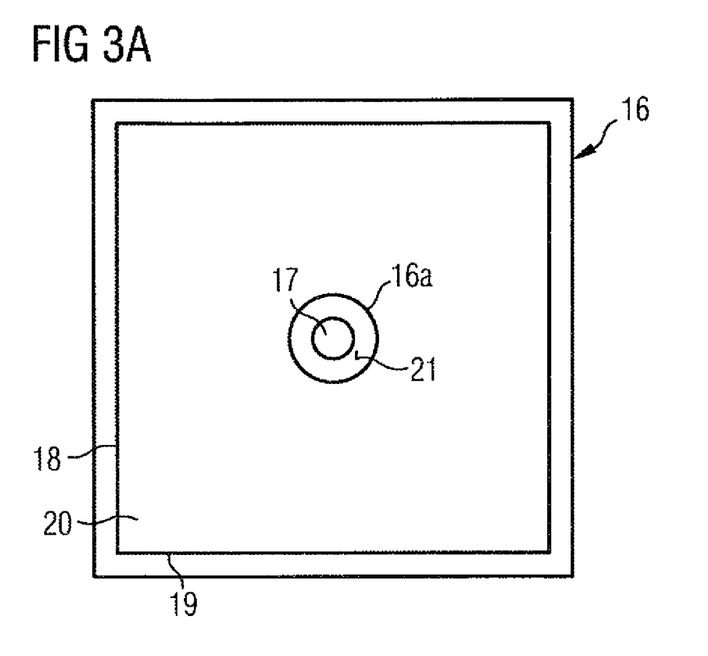
FIGS. 3A and 3B are, in each case in the same views as FIG. 1, a housing for supporting the shaft and the drive module.
Figure 3B:
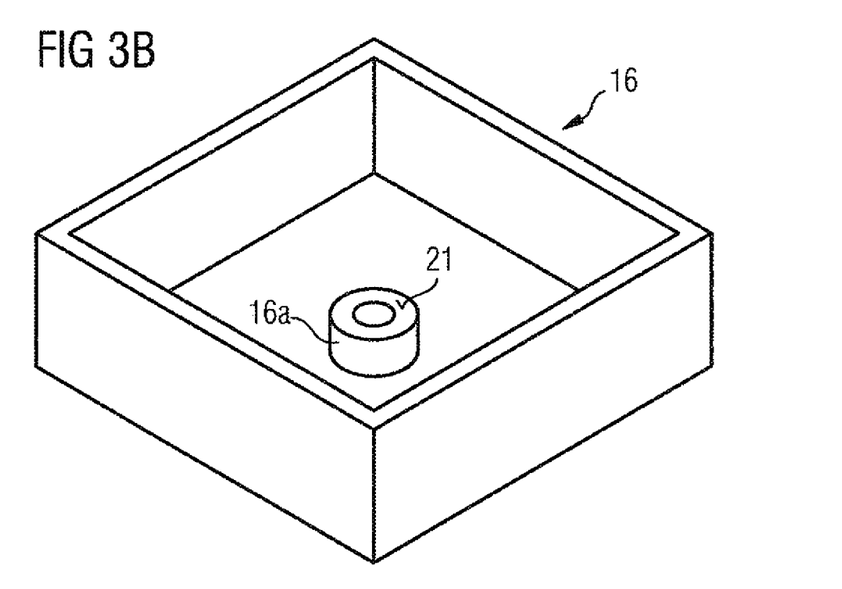

In FIGS. 3A and 3B is an approximately cubic housing suitable for this purpose, in a top view (FIG. 3A) and in a perspective view (FIG. 3B). It contains a central bearing block 16 with a cylindrical sliding bearing hole 17 which is paired with the cylindrical sliding surface of a shaft rotating in it in the form of a narrow clearance fit. The edge lengths of two adjacent inner edges, for example the inner edges 18, 19, and the position of the axis of the bearing hole 17 are dimensioned such that with a stiff and non-fatigue-critical fixing of the corner element 1 in the housing corner 20, the axis of the annular hole 10*a* of the drive ring 10 adjusts itself congruently to the axis of the bearing hole 17. The support surface 21 of the bearing block 16*a* is located in such a manner that the rolling surface of the shaft in the z direction perpendicularly to the plane of the sheet and comes to lie at a height which corresponds to the z position of the annular hole 10*a* so that the shaft can roll in the cylindrical inner surface of the annular hole 10*a* with suitable activation of the bending actuators 14, 15.

Figure 4A:
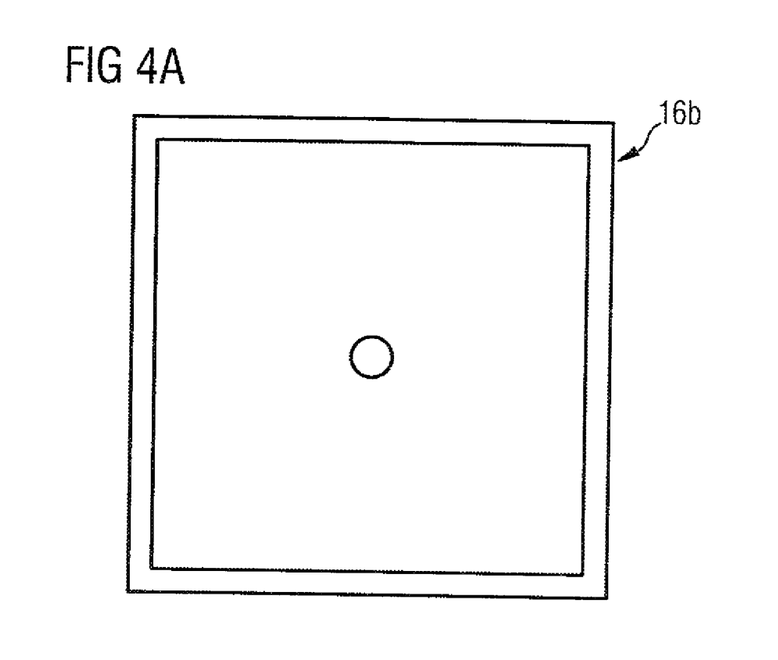
FIGS. 4A and 4B are, in each case in the same views as FIG. 1, a lid fitting the housing of FIG. 3.
Figure 4B:
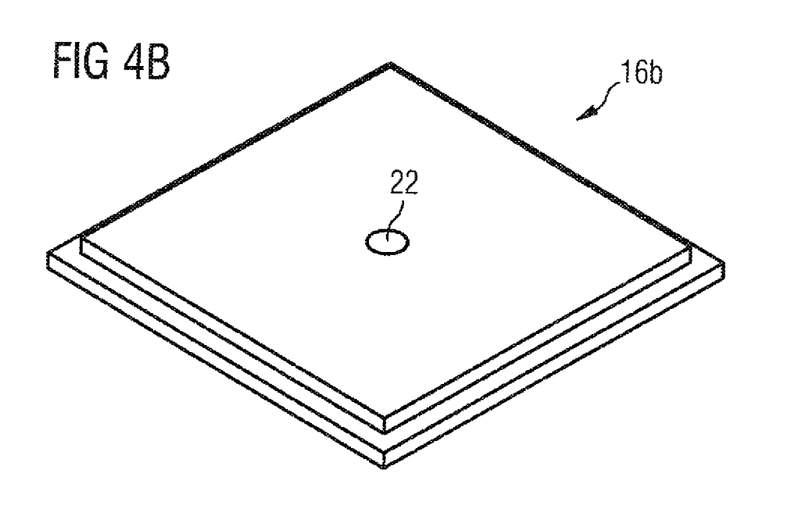

FIGS. 4A and 4B show a lid 16*b* fitting the housing 16, with a second bearing hole 22 which is paired with a second cylindrical sliding surface of the shaft in the form of a rotatable but narrow clearance fit, the hole axis of which, with a lid 16*b* inserted into the housing 16, comes to lie congruently with the axis of the annular hole 10*a* and the axis of the first bearing hole 17 in the housing 16.

FIGS. 5A and 5B are a partial assembly of the stepper drive according to the invention, with a drive module mounted in the housing 16, inserted bending actuators 14, 15, inserted shaft 23 and inserted yoke spring 24. The yoke spring 24 is supported on the shaft 23 and by with the lid 16*b*, on a surface of the lid 16*b*, with an adequate but low force in order to hold the shaft 23 supported on the surface 21 of the bearing block 16*a*, without, however, causing significant friction forces which impede the rotation of the shaft 23. This ensures that the rolling areas of drive ring 10 and shaft 23 remain localized with respect to one another sufficiently accurately in the z direction under all operating conditions.

Figure 6:
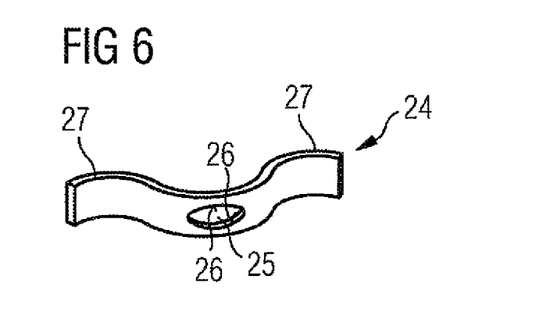
FIG. 6 is a perspective view of a yoke spring.

FIG. 6 is a suitable yoke spring 24. The yoke spring 24 contains a hole 25 for passing the shaft axle, which likewise ensures that it cannot migrate in operation. The yoke spring 24 is supported on the shaft 23 via areas 26 close to the axis of the hole in the form of a contact line in order to keep any braking torque generated by friction on the shaft 23 as small as possible. The surfaces 27 located far outside are used for supporting the yoke spring 24 on a lid surface.

Figure 7:
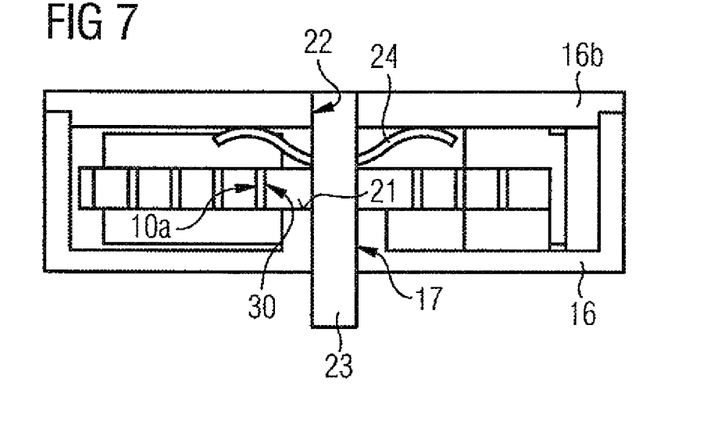
FIG. 7 is an axial cross section along the z axis through the drive in the assembled state.
Figure 8:
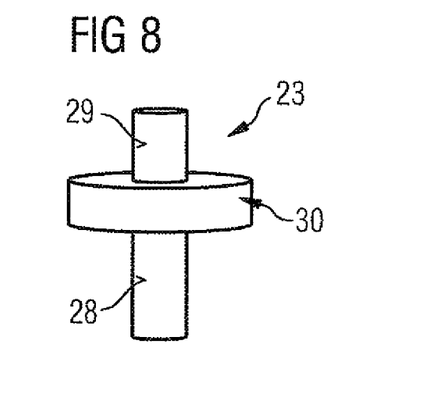
FIG. 8 is a shaft for the stepper drive according to the invention.

FIG. 8 is a suitable shaft 23. It has two cylindrical sliding bearing surfaces 28, 29 which are paired with the cylindrical inner surfaces of the bearing bores 17, 22, (FIG. 7) and at least one cylindrical rolling area 30 which is paired with at least one rolling area of the annular bore 10*a*. In this case, the axial extension of the surface 28 is used for connecting the respective element to be driven by the stepper motor.

FIG. 7 shows an axial cross section along the z axis through the drive according to the invention in the assembled state. In particular, it shows the position of its components with respect to one another. The shaft 23 is rotatable with low friction around the z axis at two places in the form of narrow clearances by means of the sliding-surface pairs 28, 17 and 29, 22 but is supported free of play. A suitable yoke spring 24, in interaction with the support surface 21, keeps the shaft 23 fixed in a low-friction manner with respect to the z direction. In a state of rest, the drive module keeps the rolling area of the annular bore 10*a* both concentrically and in the z direction in a suitable position relative to the rolling area 30 of the shaft 23.

Figure 9A:
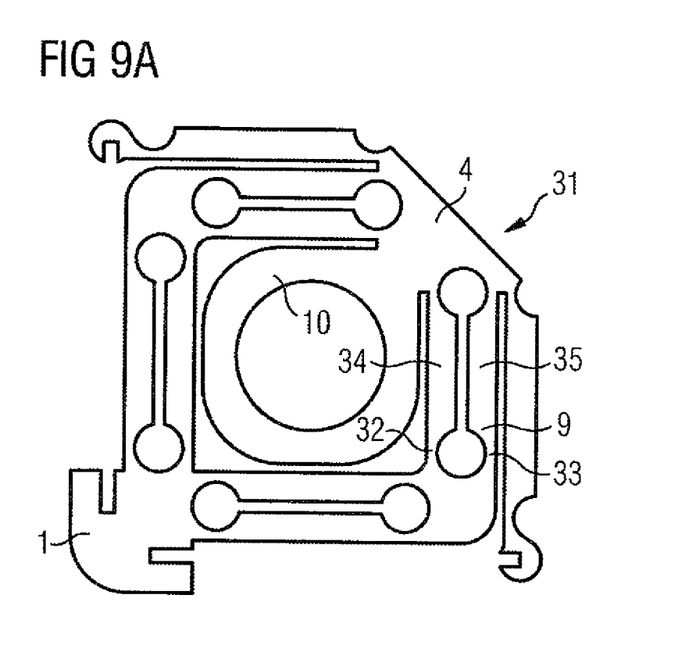
FIGS. 9A and 9B are, in each case in the same views as FIG. 1, a further embodiment of a drive module for the stepper drive according to one embodiment of the invention.
Figure 9B:
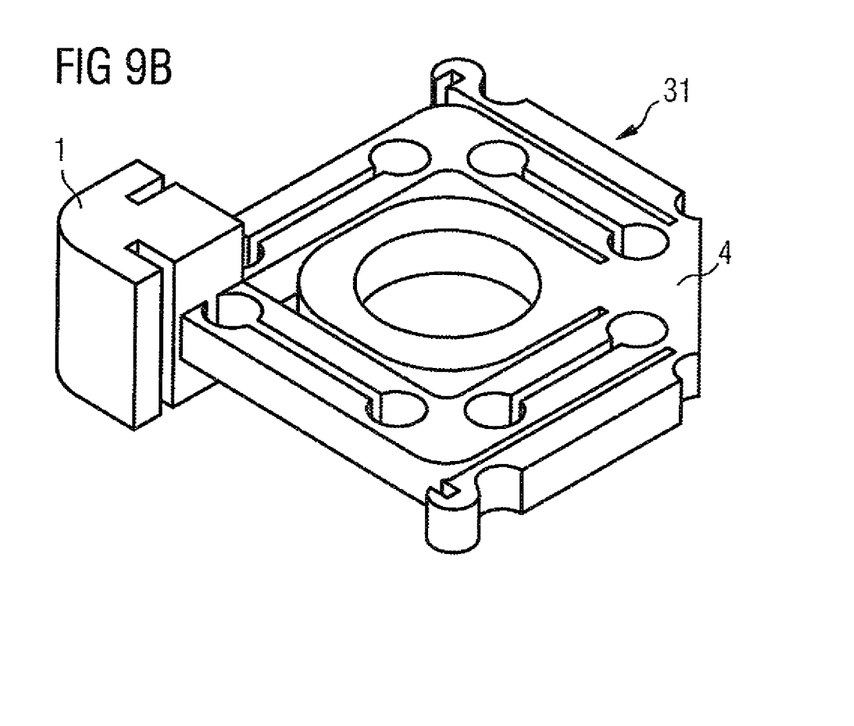

FIGS. 9A and 9B are a particularly advantageous variant of the drive module. Compared with the embodiment shown in FIGS. 1A and 1B, this embodiment offers the advantage that the distance of all points of rotation of adjacent rod elements of the frame structure 31—e.g. the points of rotation 32, 33 of the flexure hinges 9 of adjacent rod elements 34, 35—is enlarged without impairing the axial stiffness of the rod elements and without influencing the extent of the drive module overall. This modification of the flexure hinges 9 achieves a distinctly increased torsional rigidity of the frame structure 31 with respect to torques acting on the drive ring 10 compared with that of the embodiment according to FIGS. 1A and 1B.

Figure 10A:
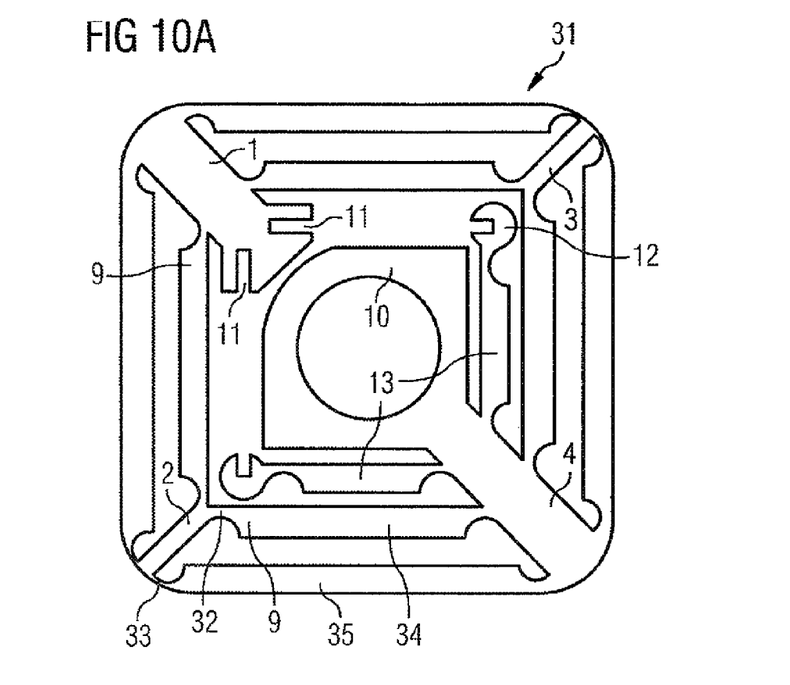
FIGS. 10A and 10B are, in each case in the same view as FIG. 1, a further embodiment of a drive module according to the invention with bending actuators arranged within the square frame structure.
Figure 10B:
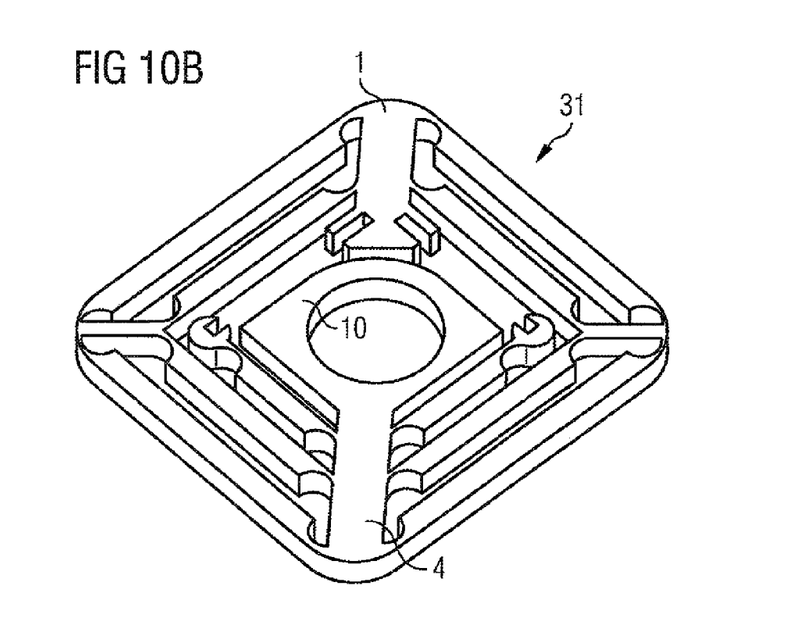

FIGS. 10A and 10B show a further variant of the drive module in which the bending actuators, in contrast with the embodiments shown before, can be arranged not outside but inside the square frame structure 31. A particularly compact structure of the stepper drive is achieved especially for actuators with shorter dimensions. In this variant, the corner elements 1, 2, 3, 4 are constructed to be strip-shaped. The flexure hinges 32, 33 can be implemented in the "asymmetric" embodiment described in FIGS. 9A and 9B.

With the aid of suitable electrical activating functions, the bending actuators 14, 15 in each case perform at their moving end 15*a* deflections with a sinusoidal or cosinusoidal variation in time around the rest position, as a result of which the rolling area of the annular bore 10*a* is kept to rest against the rolling area 30 of the shaft 23 and is moved around the rolling area 30 of the shaft 23 in the form of a circular displacement movement and, as a result, rotates the shaft 23. The direction of rotation is established by means of the relative phase angle of the x and y deflections of the drive ring 10, respectively and the speed of rotation is established with the aid of the control frequency.

In the simplest case, force is transmitted from the drive ring 10 to the shaft 23 by friction. In this context, slippage can occur based on the load torque acting on the shaft 23, of an actuating drive constructed in this manner, which reduces the accuracy of the actuating drive. The slippage is preferably reduced by the introduction of a positive fit between the rolling areas of drive ring 10 and shaft 23, especially by applying a toothing to the inner surface 10*a* of the drive ring 10 and to the outer surface of the shaft 23. In this arrangement, the drive ring 10 and the shaft 23 preferably exhibit a tooth difference of at least 1. This means that the toothing of the inner surface of the drive ring 10 comprises at least one tooth more than the outer surface of the shaft 23. If drive ring 10 and shaft 23 are operated within the actuating drive in such a manner that the toothing does not drop out of engagement, the actuating drive ideally works free of slippage.

A cycloidal toothing of drive ring 10 and shaft 23 is considered to be especially preferred. In the case of the cycloidal toothing, almost one half of all teeth is engaged as a result of which a high torque can be transferred between drive ring 10 and shaft 23. The number of teeth located on the inner surface of the drive ring 10 and the outer surface of the shaft 23 initially establishes a gearing-down of the actuating drive 1 which is typically within a range of 20:1 to 200:1. To set the actuating drive further by only one tooth, that is to say to rotate the shaft 23 by one tooth further by means of the drive ring 10, a complete period of the driving sinusoidal signal of the actuator drive 1 must be preferably passed. Since it is necessary to pass through one cycle of the drive signal for advancing by one tooth, the actuating drive is distinguished by high accuracy and by a high repetition accuracy. In addition, the number of teeth and the utilization of one cycle of the drive signal per tooth makes it possible to achieve a high angular resolution of the actuating drive. In addition to this, it is possible to interpolate arbitrarily within one period of the drive signal in order to ensure a microstepper operation of the actuating drive. The actuating drive according to preferred designs thus supplies a high efficiency, high gearing-down, a high transferrable torque based on the toothing of drive ring 10 and shaft 23, freedom from slippage during the transmission of the torque, arbitrary interpolation of the angle of rotation within one tooth of the shaft 23 (microstepper operation), low drive torque fluctuations (ripple) and a low loading on tooth flanks for drive ring 10 and shaft 23 so that the wear is also reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electromechanical motor, comprising:
   two electromechanical drive elements exhibiting respective effective motion directions arranged approximately perpendicularly to one another;
   a drive ring configured to be activated by a deflection of the electromechanical drive elements to perform a displacement movement of the drive ring;
   a shaft supported rotatably in the drive ring configured for the displacement movement of the drive ring is transmitted to the shaft such that the shaft rotates in the drive ring in response to the displacement movement; and
   a shear-flexible and torsionally rigid rectangular frame structure configured to nonradially hinge the two electromechanical drive elements to the drive ring, the drive ring arranged inside and rigidly connected to the rectangular frame structure,
   wherein the rectangular frame structure comprises four corner elements arranged approximately in the corners of a rectangle, the corners being connected to one another by respective pairs of approximately parallel rod elements, the rod elements being linked to the corner elements in each case by a flexure hinge, wherein one of the corner elements is rigidly connected to the drive ring.

2. An electromechanical motor as claimed in claim 1, wherein the flexure hinges are each case formed in a short section by a cross-sectional tapering of the rod elements.

3. An electromechanical motor as claimed in claim 2, wherein, in at least one pair of cross-sectional tapers allocated to a same pair of rod elements and a same corner element, at least one of the cross-sectional tapers of the pair is constructed offset to the center axis of the respective rod element such that a distance between points of rotation formed by the two cross-sectional tapers of the pair is enlarged with respect to a distance of the cross-sectional tapers arranged in each case centrally.

4. An electromechanical motor as claimed in claim 1, wherein a moving end of each electromechanical drive element engages in a respective corner element of the corner element connected to the drive ring.

5. An electromechanical motor as claimed in claim 1, further comprising two tension-compression rods arranged approximately perpendicularly to one another, each of the two tension-compression rods are linked at the one of corner elements connected to the drive ring, at least one of outside or inside the rectangular frame structure and extending in parallel with the respective rod elements coupled to the corner that is rigidly connected to the drive ring, a free end of each the two tension-compression rods arranged proximate to a respective neighboring corner element, a moving end of respective one of each the electromechanical drive elements is engaged with a respective one of the tension-compression rods.

6. An electromechanical motor as claimed in claim 5, wherein the tension-compression rods have a respective flexure hinge arranged at each of their two ends.

7. An electromechanical motor as claimed in claim 1, wherein the two electromechanical drive elements are bending actuators.

8. An electromechanical motor as claimed in claim 1,
   wherein the two bending actuators are arranged at least one of outside the rectangular frame structure, inside the rectangular frame structure, and approximately in parallel with the two sides of the square frame structure which are opposite the one corner element connected to the drive ring,
   wherein moving ends of the bending actuators in each case engage with the respective neighboring corner element of the corner element connected to one of the drive ring and the free end of the respective tension-compression rod.

9. An electromechanical motor, comprising:
   two electromechanical drive elements exhibiting respective effective motion directions arranged approximately perpendicularly to one another;
   a drive ring configured to be activated by a deflection of the electromechanical drive elements to perform a displacement movement of the drive ring;
   a shaft supported rotatably in the drive ring configured for the displacement movement of the drive ring is transmitted to the shaft such that the shaft rotates in the drive ring in response to the displacement movement; and
   a shear-flexible and torsionally rigid rectangular frame structure configured to nonradially hinge the two electromechanical drive elements to the drive ring, the drive ring arranged inside and rigidly connected to the rectangular frame structure,
   wherein the two bending actuators are arranged at least one of outside the rectangular frame structure, inside the rectangular frame structure, and approximately in parallel with the two sides of the square frame structure which are opposite the one corner element connected to the drive ring,
   wherein moving ends of the bending actuators in each case engage with the respective neighboring corner element of the corner element connected to one of the drive ring and the free end of the respective tension-compression rod,
   wherein the corner element opposite the corner element connected to the drive ring is fixed to a housing and has two receptacles which are in each case configured for the rigid attachment of a resting end of one the bending actuators.

10. An electromechanical motor as claimed in claim 7, wherein the square frame structure and the drive ring form a drive module fabricated in one piece by a plastic injection-molding technique, the bending actuators also being injected into the drive module.

11. An electromechanical motor, comprising:
two electromechanical drive elements exhibiting respective effective motion directions arranged approximately perpendicularly to one another;
a drive ring configured to be activated by a deflection of the electomechanical drive elements to perform a displacement movement of the drive ring;
a shaft supported rotatably in the drive ring configured for the displacement movement of the drive ring is transmitted to the shaft such that the shaft rotates in the drive ring in response to the displacement movement;
a shear-flexible and torsionally rigid rectangular frame structure configured to nonradially hinge the two electromechanical drive elements to the drive ring, the drive ring arranged inside and rigidly connected to the rectangular frame structure;
an approximately cubic housing, the housing comprising a central bearing block having a support surface and with a first bearing bore along a longitudinal axis of the central bearing block, the first bearing bore configured to bearingly mate with a first portion of the shaft;
a lid configured to mate with the housing comprising a second bearing bore the second bearing bore configured to bearingly mate with a second portion of the shaft; and
a corner element of the rectangular frame structure, the corner element being arranged in a housing corner and stiffly and permanently fixed such that the at least one cylindrical rolling area of the shaft is configured to rotate in an associated rotating area of an annular bore of the drive ring.

12. An electromechanical motor as claimed in claim 11, wherein the shaft is constructed with a disk-shaped centerpiece, a first annular front face of which rests on the bearing block and the surface area of which forms the cylindrical rolling area of the shaft.

13. An electromechanical motor as claimed in claim 12, further comprising a yoke spring configured to secure the shaft in a z direction, the yoke spring having a hole for passage of the shaft,
wherein the yoke spring is supported on a second annular front face of the disk-shaped centerpiece of the shaft opposite the first annular front face of the disk-shaped centerpiece and on the lid in place such that rotation of the shaft is not significantly impeded.

14. An electromechanical motor as claimed in claim 7, wherein the two electromechanical drive elements are piezoelectric bending actuators.

15. The electromechanical motor of claim 1, wherein the electromechanical motor is a piezoelectric microstepper drive.

* * * * *